(12) United States Patent
Boehl et al.

(10) Patent No.: US 10,387,687 B2
(45) Date of Patent: Aug. 20, 2019

(54) METHOD FOR SYMBOLIC EXECUTION ON CONSTRAINED DEVICES

(71) Applicant: NXP B.V., Eindhoven (NL)

(72) Inventors: Florian Boehl, Leuven (BE); Clemens Orthacker, Graz (AT); Klaus Martin Potzmader, Graz (AT); Andreas Daniel Sinnhofer, Graz (AT); Christian Steger, Graz (AT)

(73) Assignee: NXP B.V., Eindhoven (NL)

( * ) Notice: Subject to any disclaimer, the term of this patent is extended or adjusted under 35 U.S.C. 154(b) by 165 days.

(21) Appl. No.: 15/482,462

(22) Filed: Apr. 7, 2017

(65) Prior Publication Data

US 2018/0293406 A1    Oct. 11, 2018

(51) Int. Cl.
| | | |
|---|---|---|
| G06F 11/30 | (2006.01) | |
| G06F 12/14 | (2006.01) | |
| G06F 21/76 | (2013.01) | |
| G06F 11/36 | (2006.01) | |
| G06F 21/57 | (2013.01) | |
| H04L 9/08 | (2006.01) | |
| H04L 9/32 | (2006.01) | |
| H04L 9/00 | (2006.01) | |
| H04L 29/06 | (2006.01) | |
| G06F 21/86 | (2013.01) | |

(52) U.S. Cl.
CPC .......... *G06F 21/76* (2013.01); *G06F 11/3608* (2013.01); *G06F 21/577* (2013.01); *H04L 9/002* (2013.01); *H04L 9/0877* (2013.01); *H04L 9/3234* (2013.01); *H04L 63/123* (2013.01); *G06F 21/86* (2013.01); *G06F 2221/034* (2013.01); *H04L 9/3247* (2013.01); *H04L 2209/127* (2013.01)

(58) Field of Classification Search
USPC ....................................................... 713/188
See application file for complete search history.

(56) References Cited

U.S. PATENT DOCUMENTS

| 8,656,370 B2 | 2/2014 | Murthy et al. |
| 9,367,681 B1 | 6/2016 | Ismael et al. |
| 2007/0033576 A1* | 2/2007 | Tillmann ............ G06F 11/3688 717/124 |

(Continued)

FOREIGN PATENT DOCUMENTS

WO    99/63696 A1    12/1999

OTHER PUBLICATIONS

IEEE, Reconfigurable Dynamic Trusted Platform Module for Control Flow Checking 2014, IEEE Computer Society Annual Symposium on VLSI, pp. 166-171 (Year 2014).*

(Continued)

*Primary Examiner* — Brandon S Hoffman
*Assistant Examiner* — Samuel Ambaye

(57) ABSTRACT

A method of trust provisioning a device, including: receiving, by a hardware security module (HSM), a list of instructions configured to produce trust provisioning information; performing, by the HSM, a constraint check on the list of instructions including performing a symbolic execution of the list of instructions; receiving confidential inputs; executing, by the HSM, the list of instructions on the confidential inputs when the list of instructions passes the constraint check; outputting, by the HSM, trust provisioning information.

19 Claims, 2 Drawing Sheets

(56) References Cited

U.S. PATENT DOCUMENTS

2012/0102334 A1* 4/2012 O'Loughlin ............ G06F 21/57
                                                      713/189
2013/0205134 A1* 8/2013 Holtmanns ........... H04W 12/04
                                                      713/156

OTHER PUBLICATIONS

"Trusted Platform Module (TPM) Summary," Trusted Computing Group, 3 pgs. Retrieved from the internet Aug. 3, 2018 at: URL:https://trustedcomputinggroup.org/wp-content/uploads/Trusted-Platform-Module-Summary 04292008.pdf (Apr. 29, 2008).
Jacobs, Bart et al. "Verifast: A Powerful, Sound, Predictable, Fast Verifier for C and Java," Proceedings of the Third International Conference on NASA Formal Method, 15 pgs., retreived from the internet: https://core.ac.uk/download/pdf/34504413.pdf (2011).

* cited by examiner

METHOD FOR SYMBOLIC EXECUTION ON CONSTRAINED DEVICES

TECHNICAL FIELD

Various exemplary embodiments disclosed herein relate generally to a method for symbolic execution on constrained devices.

BACKGROUND

During a trust provisioning process, a manufacturer establishes secrets between a manufactured device and a customer before delivery. This process usually depends on long-term secret inputs from a customer and the manufacturer of the device that are used to derive the secrets to be put on the device, i.e., there is a component that is handling these long-term secret inputs and providing the device secrets as output. This component is usually a hardware security module (HSM).

A major threat in this scenario is that the HSM leaks information about long-term secrets through its output. This may happen in various ways including accidentally (programming error) or maliciously (maliciously crafted program). Thus, in many cases a thorough examination (with final certification) of the HSM code must be done before it can be used by the manufacturer for trust provisioning. With certification, the programming of the HSM is fixed. However, the required programming is usually different for every customer which leads to a large evaluation and certification effort.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of trust provisioning a device, including: receiving, by a hardware security module (HSM), a list of instructions configured to produce trust provisioning information; performing, by the HSM, a constraint check on the list of instructions including performing a symbolic execution of the list of instructions; receiving confidential inputs; executing, by the HSM, the list of instructions on the confidential inputs when the list of instructions passes the constraint check; outputting, by the HSM, trust provisioning information.

Further various exemplary embodiments relate to a method of trust provisioning a device, including: receiving, by a first hardware security module (HSM), a list of instructions configured to produce trust provisioning information; receiving confidential inputs; performing, by the first HSM, a constraint check on the list of instructions including performing a symbolic execution of the list of instructions; encrypting and signing, by the first HSM, the list of instructions when the list of instructions passes the constraint check; sending, by the first HSM, the encrypted and signed list of instructions to a second HSM; decrypting and authenticating, by the second HSM, the encrypted and signed list of instructions; executing, by the second HSM, the decrypted list of instructions on the confidential inputs when the list of instructions passes a constraint check; outputting, by the second HSM, trust provisioning information.

Further various exemplary embodiments relate to a non-transitory machine-readable storage medium encoded with instructions for execution by a hardware security module (HSM), the non-transitory machine-readable storage medium including: instructions for performing, by the HSM, a constraint check on the list of instructions including performing a symbolic execution of the list of instructions; instructions for receiving confidential inputs; instructions for executing, by the HSM, the list of instructions on the confidential inputs when the list of instructions passes the constraint check; instructions for outputting, by the HSM, trust provisioning information.

Various embodiments are described, further including receiving instruction definitions and constraints used by the constraint check on the list of instructions.

Various embodiments are described wherein the received instruction definitions and constraints have been verified using a formal model to verify that the received instruction definitions and constrains meet a specified security requirement, wherein the formal model is verified by an automated theorem prover.

Various embodiments are described wherein the confidential inputs includes confidential information of a manufacturer of a product to be trust provisioned and confidential information of a customer receiving the product to be trust provisioned.

Various embodiments are described wherein the HSM is a compute constrained device.

Various embodiments are described wherein the symbolic execution of the list of instructions tracks a confidentiality level of any parameter used by the list of instructions.

Various embodiments are described wherein a confidentiality level an output of an instruction corresponds to a confidentiality level of the input to the instruction and a definition of the instruction.

Various embodiments are described wherein the symbolic execution of the list of instructions includes assigning a data type to each parameter for the list of instructions.

Various embodiments are described wherein a parameter has specific set of values.

Various embodiments are described wherein the symbolic execution of the list of instructions includes for each instruction determining that that the confidentiality level of input to the instruction, the confidentiality level of the output, and the definition of the instruction meets a specified security requirement.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
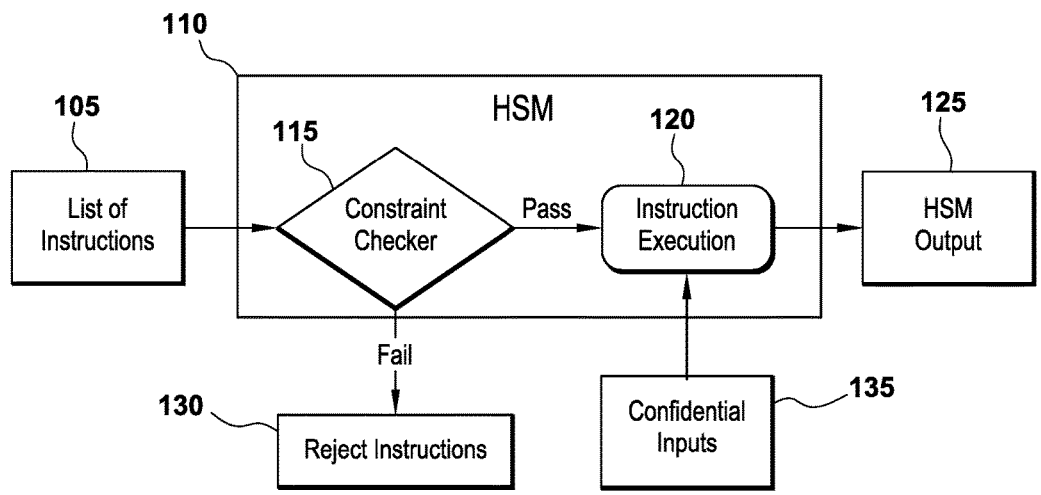
FIG. 1 illustrates a hardware security module (HSM), its inputs and outputs, and functions.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i e, and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments described below include a method incorporating the following three elements: 1) a semi-formal description of an instruction set for the trust provisioning process including constraints for the use of each instruction; 2) a formal model that can be verified with an automated theorem prover, i.e., the formal model shows that the constraints of the instruction achieve a certain goal (e.g., keeping secret data confidential); and 3) a constraint checker that performs a symbolic execution for a given set of instructions and verifies whether the instructions meet the constraints.

One way to solve the problem stated above is to make the trust provisioning generic, that is, the programming of the HSM is independent of the customer. Instead, the HSM gets a script including a list of instructions along with the long-term secrets that describes how the long-term secrets are to be used to derive the device keys. This script can then be provided for each customer and may even be provided by the customer.

The problem that arises with this approach is that the behavior of the HSM is now much more flexible and harder to assess. The embodiments described herein solve this problem: they describe a way to symbolically execute the script on the HSM to check whether it is "benign". Only then when verified, the HSM will execute the script on the provided long-term secrets. In another embodiment, two HSM's may be used. A first HSM will perform the symbolic execution, and if successful it will encrypt and sign the script. The first HSM may also receive the long-term secrets, but only uses their data classifications for the symbolic execution and not the actual values. A second HSM will decrypt the script, verify the signature of the script, and then execute the script using real long-term secrets. The second HSM may be the only device able to decrypt the encrypted script.

A formal specification of the allowed instructions with constraints and a formal model are provided to the evaluator during a certification. The model shows that the constraints are sound, i.e., that every script obeying them will keep the long-term secrets secret. This allows the evaluator to assess the correct and secure functioning of the HSM.

FIG. 1 illustrates an HSM, its inputs and outputs, and functions. The HSM 110 receives a list of instructions 105. The list of instructions 105 may be, for example, a script describing instructions to be performed by the HSM that are user specific. The list of instructions 105 may be provided by the customer or developed by the trust provider. A constraint checker 115 in the HSM 110 receives the list of instructions 105, and checks the list of instructions 105 against predefined constraints. The constraint checker 115 performs a symbolic execution of the received list of instructions 105 to verify that the list of instructions 105 meets the constraints. The predefined constraints are intended to prevent security violations, such as leaking of the customer or manufacturer secure information. If the list of instructions 105 fails to meet the predefined constraints, then the check fails and the list of instructions is rejected 130. If the list of instructions 105 passes the constraint check 115, then the list of instructions 105 is executed by an instructions execution processor 120. The instruction execution processor 120 is allowed to receive and process the confidential inputs 135. The confidential inputs 135 may be stored in a secure memory that may be, for example, tamper resistant. The instruction execution module 120 then outputs HSM outputs 125. The HSM outputs are the data and other information needed to accomplish the trust provisioning, and may then be installed in customer devices.

The HSM may be any secure device or a combination of secure devices. The secure device may include memory and a processor. The memory may include various types of memory such as, for example L1, L2, or L3 cache or system memory. As such, the memory may include static random access memory (SRAM), dynamic RAM (DRAM), flash memory, read only memory (ROM), or other similar memory devices. The memory may also be secure memory that resists tampering or access by an attacker. The HSM may also interact with an external memory that may be of any type and may be secure so as to resist tampering.

The processor may be any type of processor used to implement a cryptographic or secure function. A single processor may be used in the HSM, or two processors may be used in the HSM: one to implement the constraint checker 115; and the other to implement the instruction execution processor 120. The processor may be any hardware device capable of executing instructions, including the list of instructions 105, stored in memory or other storage (not shown) or otherwise processing data. As such, the processor may include a microprocessor, field programmable gate array (FPGA), application-specific integrated circuit (ASIC), or other similar devices. The processor may also be a secure processor that resists tampering or access by an attacker. Further, the processor may include a specific hardware implementation of a cryptographic or secure function. Further, the HSM may be a compute constrained device, meaning that the computing capability of the HSM is limited compared to more robust and general purpose processors. This may be the case partly because the processor is manufactured to be secure and tamper proof and such manufacturing become more expensive as the size and capability of the processor increases. Such constraints may include limited processing power and a limited amount of persistent memory FIG. 2 illustrates a process for defining instructions and constraints and using a formal mode to prove that the instructions along with the constraints meet desired security requirements.

Figure 2:
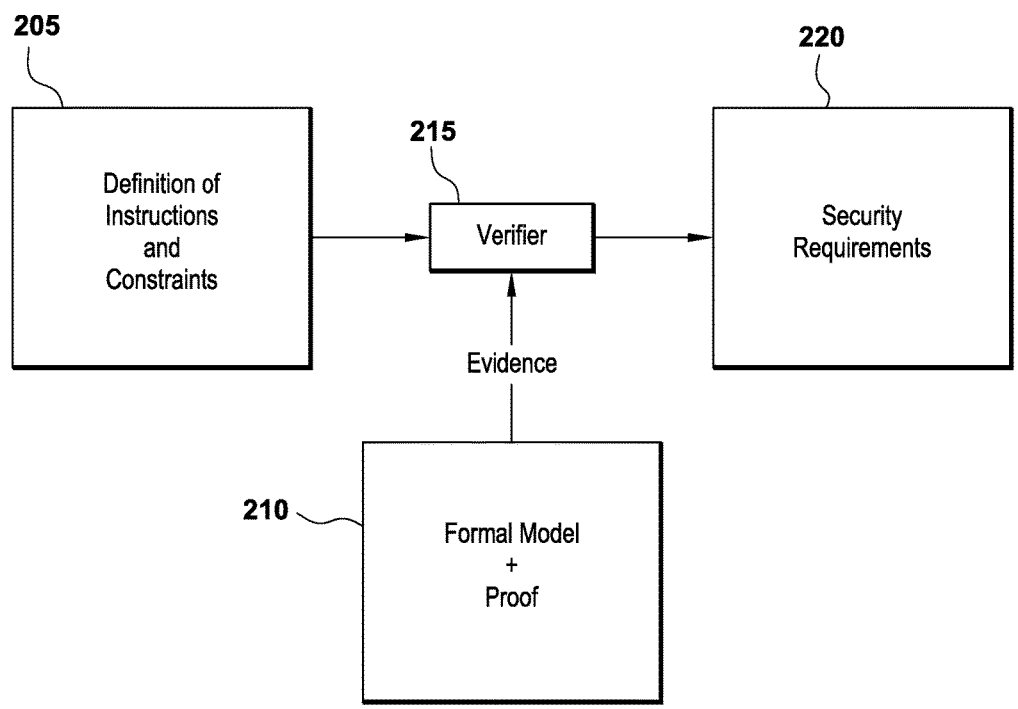
FIG. 2 illustrates a process for defining instructions and constraints and using a formal mode to prove that the instructions along with the constraints meet desired security requirements.

The process of FIG. 2 begins by developing a semi-formal description of an instruction set 205 for the trust provisioning process along with constraints for the use of each instruction. Next, a formal model 210 is provided that may be verified with an automated theorem prover. The formal model 210 may be applied to the instructions and constraints to show that the constraints of the instruction achieve certain security goals, e.g., keeping secret data confidential.

The formal model 210 may include two parts. The first part of the formal model 210 is the input for the theorem prover, which may be a text file. The input for the automatic theorem prover is the translation of the instructions and their constraints to a formal language. As the proof is conducted in the formal model 210, there is a natural gap between the formalized instructions and constraints and the instructions and constraints as executed on the HSM. To bridge this gap, the second part of the formal model 210 must provide a list of assumptions that have been made while creating the formal model and justify them.

A security verifier 215 receives the formal model and proof 210 together with the definition of instructions and constraints 205. The security verifier 215 checks whether the formal model 210 correctly captures the instructions and constraints 205. The proof then serves as evidence that the instructions and constraints 205 meet the security requirements 220. Once this process is complete, the instructions and constraints may be used by the constraint checker 115 to check lists of instructions 105 received by the HSM.

Now a more specific example will be given to illustrate the above described processes.

As discussed above, trust provisioning (TP) may securely generate chip-individual data for insertion in chips during the manufacturing process. This dynamic TP data is generated in HSMs to ensure confidentiality of customer data.

A key definition file (KDF) defines how dynamic IP data is generated by the trust provisioning HSMs. The KDF contains a set of instructions corresponding to functions to be executed in the HSM.

The KDF instructions handle secrets generated during the execution of the KDF as well as long-term secrets provided by the device manufacturer and the customer as inputs to the HSM. The HSM needs to guarantee that the output of the KDF does not violate the confidentiality of these secrets. This violation could happen accidentally, e.g., by forgetting to encrypt a secret in the KDF output, or even maliciously, e.g., by intentionally creating a KDF that leaks one of the customer's or manufacturer's long term secret keys. Examples of requirements and rules restricting the set of all possible KDFs to a subset of "secure" KDFs that do protect all secrets according to their security level are provided below. To verify whether a given KDF is secure the HSM symbolically executes the KDF once and checks all requirements before it then actually executes it on real input data.

The KDF is an example of a list of instructions 105 as described in FIG. 1. The KDF is the interface to the HSM. It is an executable record, containing both the instructions as well as all input data which is needed to generate the die individual chip data. The KDF may include several sections defining input parameters (e.g., constants, intermediate results, etc.), a section specifying the sequence of instructions to be executed by the HSM, and output sections defining which data leaves the HSM. To guarantee that a KDF does not leak any secrets, every data field may be tagged with a security level. Before a KDF is executed by an HSM, the HSM determines whether the KDF complies with the given security levels through a preceding symbolic execution.

In this example, there may be four different kinds of KDF fields: constants; secrets; inputs; and data fields.

Constants may be fields which are initialized when the KDF is created. These fields are read only and may be classified as "no secret".

Secrets may be fields which are initialized when the KDF is created. Depending on the type of secret, symmetric keys or an asymmetric key pair may be used to protect the imported secrets. The plain values are only available inside the HSM. Each secret field is classified according to the signing key/encryption key of the HSM-Secret that is applied. Secrets are read-only fields.

Inputs may be fields which reference a part of the UID input generated for each individual chip during KDF execution. During the KDF creation process only the length and the general type (e.g., production year, position on wafer, etc.) of this generated data are known. These fields are read-only and are classified as "no secret".

Data fields are fields which are designed to store intermediate or final results when the KDF is executed. Because no dynamic memory allocation is possible when the KDF is executed, the size of the fields needs to be allocated beforehand (i.e., when the KDF is created). Data fields are the only fields which can be written.

Each instruction in the KDF operates on fields, to read input data and to write intermediate output data. Fields may be passed to instructions by means of references, denoting links to specific field entries in the KDF. A reference may address the whole field, or a sub-range of the field, defined with start-index and length within the referenced field. Some instructions, may prevent the usage of sub-range references.

The output section can reference either a constant, input, or data field which is then written to the output. Output fields are collected at the end of the KDF execution when all instructions were executed. For that reason, only the last value written to a data field will actually be part of the output.

Before the HSM accepts a KDF for execution, the HSM performs a symbolic execution to find possible security violations. The HSM may perform this symbolic execution only when it receives a new KDF. The symbolic execution may distinguish various security levels (e.g., S0, S1, S2, S3, and S4). Every input field of the KDF must be tagged with a security level. The security levels define the security requirements for this input during KDF execution. In this example, there may be one security level for public data (S0), three different security levels for long-term secrets (S1, S3, S4), and one security level for generated secrets (S2). Note that other numbers and types of security levels may be used as well. A long-term secret is a secret generated outside of the KDF and provided as input to the KDF. In contrast, generated secrets are freshly generated during each KDF run. The five security levels S0 to S4 used in this example may be defined as follows.

S0 is defined as no secret. If a field is tagged as no secret, its contents are considered to be public.

S1 is defined as a known secret. Known secrets are long-term secrets with lower security requirements than customer secrets and system secrets (lower requirements in particular with regard to their protection outside of the HSM). Because they are long-term, no information must leak about the contents of these fields, because the leakage could add up over multiple KDF executions. Due to the lower security requirements, keys that are classified as known secrets may not be used to protect keys classified as S2, S3 or S4.

S2 is defined as a generated secret. A field is tagged as generated secret, if it contains a secret key generated during the execution of the KDF. Some information may leak about generated secrets, e.g., a cyclic redundancy check (CRC) or a hash of the secret, but their confidentiality level must not drop below a defined threshold bit security level. Keys that are classified as generated secrets may not be used to protect keys classified as S3 or S4.

S3 is defined as a customer secret. Fields tagged as customer secret contain long-term secrets provided by the customer. No information may leak about the contents of these fields. Keys that are classified as customer secrets may not be used to protect keys classified as S4.

S4 is defined as a system secret. Fields tagged as system secret contain long-term secrets provided by the manufacturer. No information may leak about the contents of these fields. System secrets are usually keys protecting data during the trust provisioning process. Hence these keys must only be used as keys for encryption/decryption and never be (part of) the plaintext.

Before the HSM may use a KDF it needs to check its security properties through a symbolic execution. A symbolic execution is a mechanism to check high-level properties (e.g., on data flow) of a program without actually executing it. Given that a KDF is a linear (i.e., non-branching) program and the set of instructions is relatively small, a complete symbolic execution is feasible on an HSM.

Figure 3:
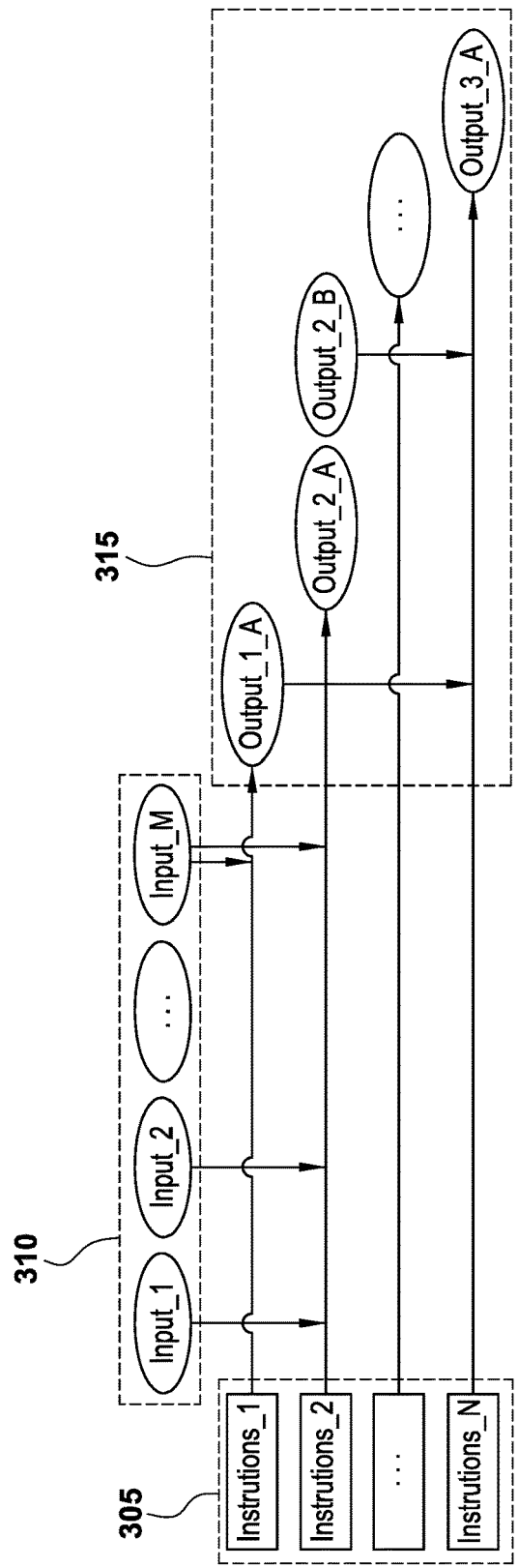
FIG. 3 provides an example of a structure of the symbolic execution of a key definition function.

FIG. 3 provides an example of a structure of the symbolic execution of a KDF. The KDF has n instructions Instruction_1 to Instruction_n 305 and m inputs Input_1 to Input_m 310. The inputs may be the constant, secret, and input fields of the KDF described above. Each instruction may take any of the already existing fields as a parameter. Furthermore, each instruction may introduce at least one new field, which is the output. The use of the fields during the symbolic execution will be tracked and recorded so that the state of execution can be traced. Hence a copy instruction, for example, will take one field as a parameter and introduce one new field as output. The properties of the output field—such as the data type and the confidentiality level—depend on the instruction and are hence defined in its description.

To assure that the confidentiality of secrets is maintained, the symbolic execution tracks the confidentiality level (CL) of every field. This can be an integer between zero and some maximum confidentiality value or the value NULL meaning that the CL has not been assigned yet.

How the value NULL is treated for computations must be stated specifically in every case except when there is a defined default behavior.

If the confidentiality level of a field is not NULL, it provides a lower bound on the security, measured in bits, with regard to the confidentiality of that field. That is the expected number of operations required to learn the value of this field. For example, if a field has a confidentiality level of 100 bits, the expected effort of the adversary is $2^{100}$ operations to learn its value. Often assumptions regarding the security of cryptographic algorithms (i.e., security of AES, TDEA, RSA, . . . ) is important for assessing the confidentiality level of a field. Which level of security can be expected from the different operations may be specified.

The confidentiality of fields is traced back to the input fields after the symbolic execution. Each output field of the KDF will get a confidentiality level of 0. For each field the confidentiality update section of the instruction that produced the output in that field dictates how the confidentiality level is propagated to the inputs, i.e., how the confidentiality level of the inputs changes based on a change of the confidentiality level of one of the outputs.

The confidentiality level of a field is actually the minimum of two confidentiality levels: The confidentiality level considering direct leakage and the confidentiality level considering threshold leakage. These two concepts are explained as follows.

The confidentiality level ConfDL(F) considering direct leakage of a field F is the confidentiality level of F considering only published information (i.e., with a confidentiality level of zero) that lowers the confidentiality level of F by a certain amount L, the leakage. Hence it may be denoted as Leak(F, L) in the symbolic execution. The value L must be independent of confidentiality level F. This kind of leakage is dubbed "direct leakage" because it directly helps the adversary. For example, publishing the 32-bit checksum computed over F directly leaks 32 bits of information about F's value. The confidentiality level of F has a lower bound of 0 (i.e., once it reaches 0 all further leakage is ignored). In contrast to the direct leakage, there is also threshold leakage as explained below.

The confidentiality level considering threshold leakage of a field F (denoted as ConfTH(F)) is the confidentiality level of F considering only published information (i.e., with a confidentiality level of zero) that adds a lower bound B for the confidentiality level of F. Hence it is denoted as AddConfLB(F, B) in the symbolic execution. This kind of leakage is called threshold leakage because it directly helps the adversary only after performing an expected amount of $2^{ConfTH(F)}$ operations; however, the assumption is that the adversary learns the complete value of F once he invests $2^{ConfTH(F)}$ operations (or more). For example, publishing the output of a symmetric encryption of F using a key K that provides a security level of 80 bits sets the threshold leakage of F to 80. ConfTH(F) has a natural lower bound of 0. In contrast to the threshold leakage, there is also direct leakage as explained above.

Every instruction specifies a ConfDL(F) and ConfTH(F) operation for each of its output fields F. A field is an output field of an instruction if the instruction writes to it. The ConfDL(F) and ConfTH(F) operations provides the current confidentiality level (considering direct leakage or considering threshold leakage) of the corresponding output field. This value may depend on the confidentiality level of other fields, e.g., inputs of the instruction (which, in turn, may be output fields of other instructions; to learn their current confidentiality level, the corresponding function is called for them).

Similarly, every instruction may define a Leak(F, L) and a AddConfLB(F, B) operation for each of its output fields. These operations describe how direct leakage/threshold leakage are propagated to the inputs of the instruction.

The symbolic execution assigns a data type to every field in the KDF. This allows it to check the type requirements of instructions. If a parameter of an instruction requires a specific data type, the symbolic execution accepts every subtype of that data type as well. Some data types have additional parameters. The symbolic execution sets specific values for these parameters once it assigns such a data type to a field. Parameters allow for a more concise description of requirements. The alternative would be to have additional subtypes corresponding to all possible parameter values.

Various security considerations should be considered while defining the requirements for instructions and the symbolic execution. Often, the definitions are a balancing act between simple requirements and use cases that need to be supported. Many of the considerations do not directly point to a specific attack that would be possible if they are ignored. The design principle here—as in general for the use of cryptography—is safe use, i.e., sticking to constructions that are known to be secure and avoiding those which are not—even if no concrete attack is publicly known. The purpose behind the specific definition of data types is to prevent misuse of data with an impact on security.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, key delivery systems described herein may include a computer implementing a computer program. Such system, may also include other hardware elements including storage, network interface for transmission of data with external systems as well as among elements of the key delivery systems.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of trust provisioning a device, comprising: receiving, by a hardware security module (HSM), a list of instructions configured to produce trust provisioning information, wherein every input field of the list of instructions must be tagged with a security level: performing, by the HSM, a constraint check on the list of instructions including performing a symbolic execution of the list of instructions; wherein the symbolic execution of the list of instructions includes, for each instruction, determining the confidentiality level of input to the instruction, the confidentiality level of the output, and whether the definition of the instruction meets a specified security requirement; receiving confidential inputs; executing, by the HSM, the list of instructions on the confidential inputs when the list of instructions passes the constraint check; and outputting, by the HSM, generic trust provisioning information, wherein the generic trust provisioning information comprises chip-individual data for insertion in chips during a manufacturing process.

2. The method of claim 1, further comprising: receiving instruction definitions and constraints used by the constraint check on the list of instructions.

3. The method of claim 2, wherein the received instruction definitions and constraints have been verified using a formal model to verify that the received instruction definitions and constrains meet a specified security requirement, and the formal model is verified by an automated theorem prover.

4. The method of claim 1, wherein the confidential inputs includes confidential information of a manufacturer of a product to be trust provisioned and confidential information of a customer receiving the product to be trust provisioned.

5. The method of claim 1, wherein the HSM is a compute constrained device.

6. The method of claim 1, wherein the symbolic execution of the list of instructions tracks a confidentiality level of any parameter used by the list of instructions.

7. The method of claim 1, wherein a confidentiality level an output of an instruction corresponds to a confidentiality level of the input to the instruction and a definition of the instruction.

8. The method of claim 1, wherein the symbolic execution of the list of instructions includes assigning a data type to each parameter for the list of instructions.

9. The method of claim 8, wherein a parameter has specific set of values.

10. A method of trust provisioning a device, the method comprising: receiving, by a first hardware security module (HSM), a list of instructions configured to produce trust provisioning information, wherein every input field of the list of instructions must be tagged with a security level: receiving confidential inputs; performing, by the first HSM, a constraint check on the list of instructions including performing a symbolic execution of the list of instructions; wherein the symbolic execution of the list of instructions includes, for each instruction, determining the confidentiality level of input to the instruction, the confidentiality level of the output, and whether the definition of the instruction meets a specified security requirement; encrypting and signing, by the first HSM, the list of instructions when the list of instructions passes the constraint check; sending, by the first HSM, the encrypted and signed list of instructions to a second HSM; decrypting and authenticating, by the second HSM, the encrypted and signed list of instructions; executing, by the second HSM, the decrypted list of instructions on the confidential inputs when the list of instructions passes a constraint check; and outputting, by the second HSM, generic trust provisioning information, wherein the generic trust provisioning information comprises chip-individual data for insertion in chips during a manufacturing process.

11. A non-transitory machine-readable storage medium encoded with instructions for execution by a hardware security module (HSM), the non-transitory machine-readable storage medium comprising: instructions for performing, by the HSM, a constraint check on the list of instructions including performing a symbolic execution of the list of instructions, wherein every input field of the list of instructions must be tagged with a security level; wherein the symbolic execution of the list of instructions includes, for each instruction, determining the confidentiality level of input to the instruction, the confidentiality level of the output, and whether the definition of the instruction meets a specified security requirement; instructions for receiving confidential inputs; instructions for executing, by the HSM, the list of instructions on the confidential inputs when the list of instructions passes the constraint check; and instructions for outputting, by the HSM, generic trust provisioning information, wherein the generic trust provisioning information comprises chip-individual data for insertion in chips during a manufacturing process.

12. The non-transitory machine-readable storage medium of claim 11, further comprising: instructions for receiving instruction definitions and constraints used by the constraint check on the list of instructions.

13. The non-transitory machine-readable storage medium of claim 12, wherein the received instruction definitions and constraints have been verified using a formal model to verify that the received instruction definitions and constrains meet a specified security requirement, and the formal model is verified by an automated theorem prover.

14. The non-transitory machine-readable storage medium of claim 11, wherein the confidential inputs includes confidential information of a manufacturer of a product to be trust provisioned and confidential information of a customer receiving the product to be trust provisioned.

15. The non-transitory machine-readable storage medium of claim 11, wherein the HSM is a compute constrained device.

16. The non-transitory machine-readable storage medium of claim 11, wherein the symbolic execution of the list of instructions tracks a confidentiality level of any parameter used by the list of instructions.

17. The non-transitory machine-readable storage medium of claim 11, wherein a confidentiality level an output of an instruction corresponds to a confidentiality level of the input to the instruction and a definition of the instruction.

18. The non-transitory machine-readable storage medium of claim 11, wherein the symbolic execution of the list of instructions includes assigning a data type to each parameter for the list of instructions.

19. The non-transitory machine-readable storage medium of claim 18, wherein a parameter has specific set of values.

* * * * *